United States Patent
Watson et al.

(10) Patent No.: US 10,565,576 B2
(45) Date of Patent: Feb. 18, 2020

(54) POINT OF SALE TRANSACTIONS

(71) Applicant: Diebold Nixdorf, Incorporated, North Canton, OH (US)

(72) Inventors: Devon Watson, North Canton, OH (US); David William Kuchenski, Tallmadge, OH (US); Alex Klein, Cuyahoga Falls, OH (US); Matt Zaugg, Munroe Falls, OH (US); Brian Block, North Canton, OH (US); Richard Harris, Warshash (GB); Robert Konecny, Uniontown, OH (US)

(73) Assignee: Diebold Nixdorf, Incorporated, North Canton, OH (US)

( * ) Notice: Subject to any disclaimer, the term of this patent is extended or adjusted under 35 U.S.C. 154(b) by 490 days.

(21) Appl. No.: 15/406,184

(22) Filed: Jan. 13, 2017

(65) Prior Publication Data

US 2017/0206516 A1 Jul. 20, 2017

Related U.S. Application Data

(60) Provisional application No. 62/278,962, filed on Jan. 14, 2016.

(51) Int. Cl.
*G06Q 20/20* (2012.01)
*G06K 19/06* (2006.01)
(Continued)

(52) U.S. Cl.
CPC ..... *G06Q 20/201* (2013.01); *G06K 19/06037* (2013.01); *G06Q 20/1085* (2013.01);
(Continued)

(58) Field of Classification Search
CPC .............. G06Q 20/201; G06Q 20/208; G06Q 20/1085; G06Q 20/18; G06Q 20/3274;
(Continued)

(56) References Cited

U.S. PATENT DOCUMENTS

| | | | |
|---|---|---|---|
| 7,593,873 B1 * | 9/2009 | Oakes, III | G06Q 20/32 705/26.1 |
| 8,418,919 B1 * | 4/2013 | Beyda | G07G 1/0054 235/375 |

(Continued)

OTHER PUBLICATIONS

Kasavana, Michael. "How Amazon Go is reinventing retail and its possible impact on self checkout kiosks". Retrieved from <https://www.kioskmarketplace.com/blogs/how-amazon-go-is-reinventing-retail-and-its-possible-impact-on-micro-market-kiosks/> on Jun. 5, 2019. Originally Published Jan. 2017. (Year: 2017).*

(Continued)

*Primary Examiner* — Nathan A Mitchell
(74) *Attorney, Agent, or Firm* — Black, McCuskey, Souers & Arbaugh, LPA

(57) ABSTRACT

A system provides for a self-checkout terminal with various components. A receiver receives shopping data including prices of items that a customer has physically acquired or placed in a cart. A payment logic receives credential information associated with a monetary account for paying for the items. A message logic creates checkout data that includes data representing the collection of purchase items. A transmitter transmits the credential information to an account network for authentication and the receiver receives a response indicating if the monetary account is valid. The payment logic/self-checkout terminal indicates to the customer that a payment using the monetary account for the purchase items is authorized or not. When authorized, an authorization is received at the self-checkout terminal before the customer arrives at the terminal and the self-checkout terminal causes a payment transaction to be executed to provide for self-checkout using the monetary account without assistance by another person.

23 Claims, 14 Drawing Sheets

(51) Int. Cl.
*G06Q 20/10* (2012.01)
*G06Q 20/18* (2012.01)
*G06Q 20/32* (2012.01)
*G06Q 20/40* (2012.01)
*G07G 1/00* (2006.01)

(52) U.S. Cl.
CPC ........... *G06Q 20/18* (2013.01); *G06Q 20/202* (2013.01); *G06Q 20/208* (2013.01); *G06Q 20/3274* (2013.01); *G06Q 20/3278* (2013.01); *G06Q 20/405* (2013.01); *G07G 1/0045* (2013.01)

(58) Field of Classification Search
CPC ............. G06Q 20/3278; G06Q 20/405; G06Q 20/202; G07G 1/0081; G07G 1/0045; G06K 19/06037
See application file for complete search history.

(56) References Cited

U.S. PATENT DOCUMENTS

| | | | | |
|---|---|---|---|---|
| 8,438,066 | B1* | 5/2013 | Yuen | G06Q 20/206 705/16 |
| 8,751,316 | B1* | 6/2014 | Fletchall | G07G 1/0081 705/16 |
| 2008/0243626 | A1 | 10/2008 | Stawar et al. | |
| 2009/0017779 | A1* | 1/2009 | Bonner | H04L 67/12 455/95 |
| 2011/0184821 | A1* | 7/2011 | Mon | G06Q 20/105 705/17 |
| 2012/0004769 | A1* | 1/2012 | Hallenbeck | G06Q 30/06 700/232 |
| 2012/0095853 | A1* | 4/2012 | von Bose | G06Q 20/20 705/16 |
| 2012/0158529 | A1* | 6/2012 | Edwards | G06Q 20/20 705/23 |
| 2012/0253913 | A1* | 10/2012 | Richard | G06Q 20/322 705/14.27 |
| 2012/0284132 | A1 | 11/2012 | Kim et al. | |
| 2013/0103537 | A1* | 4/2013 | Hewett | G06Q 30/0633 705/26.7 |
| 2013/0284806 | A1* | 10/2013 | Margalit | G06Q 30/06 235/382 |
| 2014/0058946 | A1* | 2/2014 | Paranjape | G07G 1/0081 705/44 |
| 2014/0172610 | A1* | 6/2014 | Carpenter | G06Q 20/40 705/26.1 |
| 2014/0263631 | A1* | 9/2014 | Muniz | A47F 9/047 235/383 |
| 2014/0279191 | A1* | 9/2014 | Agarwal | G06Q 30/0633 705/26.7 |
| 2015/0039458 | A1* | 2/2015 | Reid | G06K 9/00335 705/26.1 |
| 2015/0134470 | A1 | 5/2015 | Hejl et al. | |
| 2017/0158215 | A1* | 6/2017 | Phillips | B62B 5/0096 |
| 2017/0323376 | A1* | 11/2017 | Glaser | G06Q 30/0643 |
| 2018/0144342 | A1* | 5/2018 | Borandi | G06Q 20/401 |

OTHER PUBLICATIONS

Alba, Davey. "Only Amazon Could Make a Checkout-Free Grocery Store a Reality". Retrieved from <https://www.wired.com/2016/12/amazon-go-grocery-store/> on Jun. 5, 2019. Originally Published Dec. 2016. (Year: 2016).*

Paypal. "Mobile and the New Digital Store". Retrieved from <https://www.paypalobjects.com/digitalassets/c/website/marketing/global/shared/global/media-resources/documents/paypal-mobile-retail-white-paper.pdf> on Jun. 5, 2019. Originally Published Apr. 2016. (Year: 2016).*

Atos. "The Future of In-Store Shopping." Retrieved from <https://atos.net/wp-content/uploads/2017/10/01122013-AscentWhitePaper-FutureInStoreShopping.pdf> on Jun. 5, 2019. Originally Published 2013. (Year: 2013).*

International Search Report and Written Opinion for corresponding PCT application No. PCT/US2017/013468.

* cited by examiner

POINT OF SALE TRANSACTIONS

CROSS REFERENCE TO RELATED APPLICATION

This application claims priority from U.S. Provisional Application Ser. No. 62/278,962, filed Jan. 14, 2016; the disclosure of which is incorporated herein by reference.

FIELD OF THE INVENTION

Various configurations of the current invention relate generally to apparatus, systems, and methods purchasing items for sale. More particularly, the apparatus, systems, and methods relate to purchasing items for sale in a retail setting. Specifically, the apparatus, systems, and methods provide automated transactions at self-checkout terminals.

BACKGROUND

The exchanges of goods and services often involves systems for providing financial services and financial transactions. For example, in a retail setting a customer will enter a store with the intent to purchase a product such as food in a grocery store or clothing and/or household items in a retail store. The person will browse different aisles in a store when collecting products they desire to purchase or simply to browse and view the product offerings. Often the customer will select items and put them in a shopping cart or bag so that the items are easier to carry. Later, when the customer is ready to pay for their acquired items, they would approach a checkout area and stand in a line waiting for the next available checkout clerk. When a clerk is available, the customer would unload their items for purchase and the clerk would scan them or enter the cost of each item in another way so that a computer could tabulate a total cost of the items as well as calculate a tax for taxable items. In some scenarios, coupons may be presented to the clerk by the customer to further reduce the total cost of the items. In other scenarios, incentive coupons may be printed out by a check-out computer based on items currently purchased to entice the customer to soon return to that same retail establishment. What is needed is a better way for a customer to checkout and pay for items being purchased.

SUMMARY

One embodiment is a self-checkout terminal to efficiently checkout customers without requiring any store personnel assistance and without scanning products a customer desires to purchase at the self-checkout terminal. The self-checkout terminal includes a transmitter, a receiver, a payment logic, and a message logic. The receiver receives shopping data associated with the purchase price of items that a customer has physically acquired during a shopping activity at a retail establishment. The shopping data is based, at least in part, on numbers of each corresponding item for purchase that the customer has acquired during the shopping activity. The payment logic receives credential information associated with a monetary account that the customer is to use to pay for a collection of purchase items that the customer has acquired during the shopping activity and desire to purchase. The message logic transforms the shopping data into check-out data that includes data representing the collection of purchase items. The transmitter transmits the credential information to an account network for authentication. The receiver receives a response from the account network indicating if the monetary account is authorized to pay for the collection of purchase items. Next the payment logic causes the self-checkout terminal to indicate to the customer that a payment using the monetary account for the purchase items is authorized or that the payment was not authorized. Once authorized, the system ensures that an authorization notification is received at the self-checkout terminal before the customer arrives at the self-checkout terminal. Also, when authorized, the self-checkout terminal causes a payment transaction to be executed to provide for self-checkout and the payment using the monetary account without scanning the items at the self-checkout terminal and without assistance by another person.

In other configurations, the payment logic further causes the self-checkout terminal to indicate to the customer that the payment for the purchase items is authorized when the customer approaches the self-checkout terminal. Then the shopping data is automatically sent to the receiver when purchase items are removed from the checkout area by the customer after the transaction is complete (e.g., carried or placed in a pocket).

In some embodiments, the receiver will receive the shopping data from a mobile device carried by the customer. The mobile device may be a mobile phone that may communicate with the transmitter and the receiver using low power electromagnetic waves with a signal strength providing for the mobile device for communication with the self-checkout terminal having a communication range of less than 10 meters from the self-checkout terminal. In alternative configurations, the self-checkout terminal is an automated-transaction-machine (ATM) and/or a point of sale (POS) device and/or a combination of the ATM and POS.

In yet other configurations, the credential information is received from a mobile device carried by the customer, and the credential information comprises customer-account credentials associated with the monetary account that allows a remote banking server to use the customer-credentials to verify that the customer has authorized access to the monetary account. The credentials may be stored in a digital wallet in the mobile device and maybe associated with a credit card, debit card, store card, and the like.

In at least one embodiment, the self-checkout terminal may perform the payment transaction without requiring the use of any banking card, and the self-checkout terminal is incapable of reading information from any banking card. When the monetary account is authorized, the payment transaction is executed and funds from the monetary account pay for the purchase items. Once the transaction is complete, the self-checkout terminal then generates a signal to indicate to the customer that the payment for the purchase items has been successfully completed. The signal may be an illuminated light area associated with the self-checkout terminal that may be lighted in a green color or another color.

Other embodiments may include a cash-dispensing device for dispensing cash. The account network receives a request for cash from the customer. The account network is authorized to approve the request based, at least in part, on credentials received from the customer and a value of the monetary account. Once approved, the cash dispenser issues and transmits a cash-back symbol to a mobile device carried by the customer. Upon reaching the self-checkout terminal, the self-checkout terminal is adapted to receive the cash-back symbol from the mobile device. Upon the cash-back symbol being verified, the cash-dispensing device dispenses the request. In some configurations, the cash-back symbol is a Quick Response (QR) code, a code transmitted as a near-field-communication (NFC) signal, or another code.

Another embodiment includes a monetary-acceptance device that accepts cash deposits. In this embodiment, the account network is notified that the monetary account has insufficient funds to pay for the collection of purchase items. The account network has an account computer that in response to the monetary account having insufficient funds, generates a message to the customer indicating insufficient funds and transmits the message symbol to a mobile device carried by the customer. Upon reaching the self-checkout terminal, the self-checkout terminal is adapted to receive the insufficient funds symbol from the mobile device, and upon the insufficient funds symbol being verified, the monetary-acceptance device receives the funds from the user. The insufficient funds symbol may be a QR code, a code transmitted as a NFC signal, or another type of code/signal.

Other embodiments may have other useful features and/or components. For example, the shopping data may be formatted into one or more packets of data for transmission over the account network. The credential information may be received from a mobile device carried by the customer. A mobile application software on the mobile device may tabulate scanned items and to transfer a tabulation result to the self-checkout terminal or a cloud type of network. In some configurations, an account computer of the account network authorizes the payment but does not update account with purchase information.

Another configuration is a payment system. The payment system includes a self-checkout unit responsive to data from a mobile device. The data is representative of at least one item to be purchased by a user of the mobile device. For example, items placed in a shopping cart or carried by a user. The self-checkout unit at least partially processes a transaction for purchase of the at least one item based, at least in part, on the data from the mobile device. A payment for the items is processed at the self-checkout unit solely by the user without any other persons required at the self-checkout unit. Additionally, other than an optional single tap of the self-checkout unit no other touching of the self-checkout unit is required.

Another configuration is a method of self-checkout of shopping items. The method begins by receiving shopping data associated with the prices of one or more items for purchase. This may occur each time a consumer physically acquires the item(s) during a shopping activity and carries the item(s) or puts the item(s) in his/her shopping cart. Credential information is received that is associated with a financial account to be used to pay for the one or more items for purchase. The credential information is then transmitted to an account computer of an account network for authentication. Next, a response is received from the account computer indicating if the financial account is authorized to pay for the one or more items. When the financial account is authorized to pay for the one or more items, an indication is generated to alert the consumer whether a payment for the items is authorized as the consumer approaches and before the consumer is at the self-checkout terminal. Also, when authorized, the payment is automatically sent electronically from the financial account to provide a method of payment for the purchase items at a self-checkout terminal. The transaction is completed without scanning the purchase items and without assistance by another person. Additionally, the payment is made with an optional single tap of the self-checkout terminal without any other required touching of the self-checkout terminal.

Other embodiments may relate more particularly to automated transactions at a point-of-sale device and a point-of-sale transaction performed with an automated-transaction-machine (ATM). Various aspects of example embodiments may become apparent to those skilled in the art from the following detailed description and the accompanying drawings.

BRIEF DESCRIPTION OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples, one element may be designed as multiple elements or that multiple elements may be designed as one element. In addition, it is appreciated that the figures provided herewith are for explanation purposes to persons ordinarily skilled in the art and that the drawings are not necessarily drawn to scale and that some portions of some drawings may be exaggerated so that some details may more easily be seen and described. In some examples, an element shown as an internal component of another element may be implemented as an external component and vice versa. Furthermore, elements may not be drawn to scale.

DETAILED DESCRIPTION OF THE EMBODIMENTS

Figure 1:
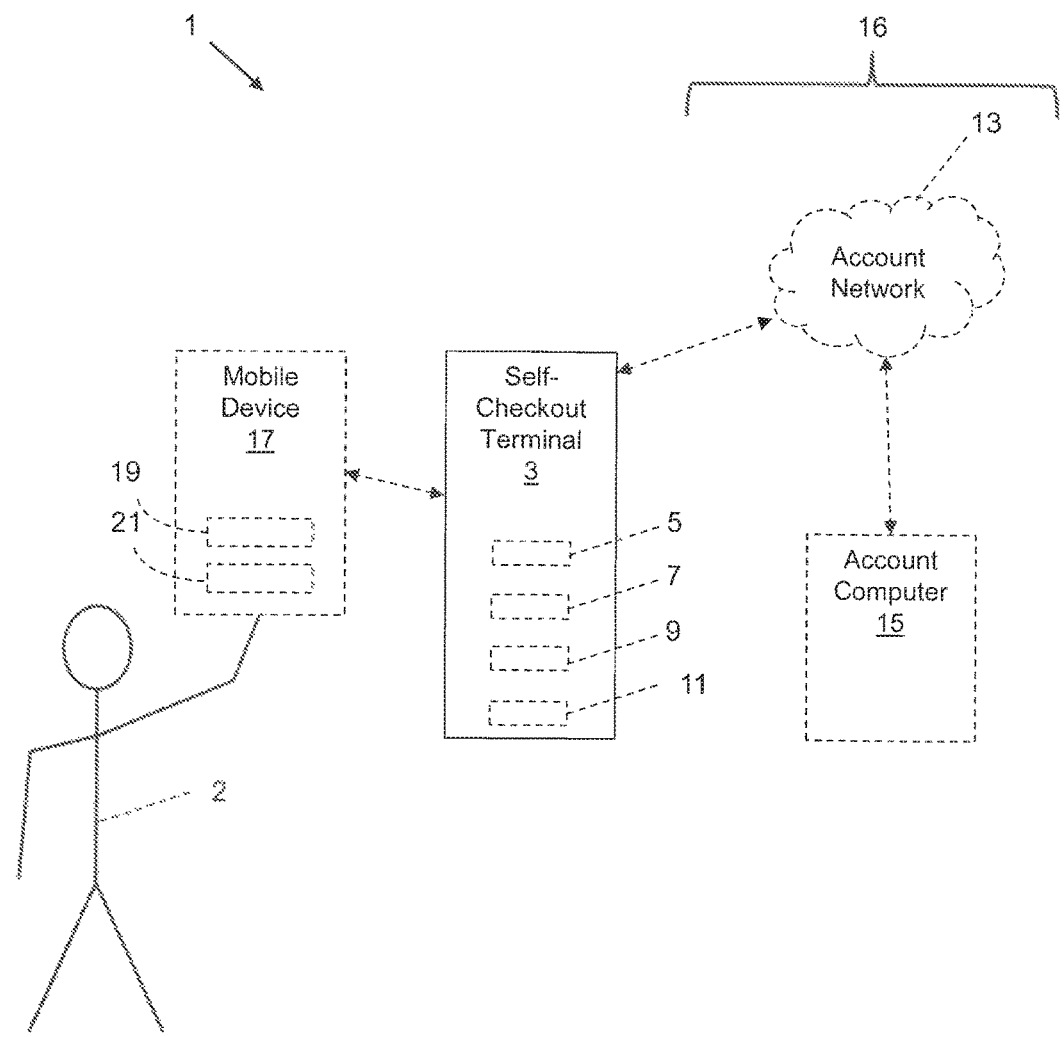
FIG. 1 illustrates an example system using a self-checkout terminal for paying for items selected in a store.

FIG. 1 illustrates one embodiment of a system 1 utilizing a self-checkout terminal 3. The self-checkout terminal has a transmitter 5, a receiver 7, a payment logic 9, and a message logic 11. The receiver 7 receives shopping data associated with prices of purchase items that a customer 2 has physically acquired during a shopping activity at a retail establishment. For example, the shopping data may be scanned from an item and may include the item's price, what type of item is being selected for purchase, as well as other information related to the item. In other embodiments, the item may not be scanned, but cameras may be used to detect the item being picked up and carried away or placed in a shopping cart. The items/card may be reimaged several more times before the customer checks out of the store. The shopping data may be based, at least in part, on numbers of each corresponding item for purchase that the customer 2 has acquired during the shopping activity to allow for the price of the corresponding item to be multiplied by the number of the same corresponding items acquired by the customer/shopper.

Additionally, functionality of components of the systems described herein may be implemented with one or more processors executing software instructions and/or be implemented with other hardware logic. "Processor" and "Logic", as used herein, includes but is not limited to hardware, firmware, software and/or combinations of each to perform a function(s) or an action(s), and/or to cause a function or action from another logic, method, and/or system. For example, based on a desired application or needs, logic and/or processor may include a software-controlled microprocessor, discrete logic, an application specific integrated circuit (ASIC), a programmed logic device, a memory device containing instructions or the like. Logic and/or processor may include one or more gates, combinations of gates, or other circuit components. Logic and/or a processor may also be fully embodied as software. Where multiple logics and/or processors are described, it may be possible to incorporate the multiple logics and/or processors into one physical logic (or processors). Similarly, where a single logic and/or processor is described, it may be possible to distribute that single logic and/or processor between multiple physical logics and/or processors.

The payment logic 9 receives via the receiver 7 credential information associated with a monetary (e.g., financial) account that the customer 2 is to use to pay for a collection of purchase items for purchase that the customer 2 has acquired during the shopping activity. In one embodiment, the credential information may be received from a mobile device 17 that is carried by the customer 2 or that is provided to the customer 2 upon the customer 2 entering a retail establishment. The mobile device 17 may be a mobile phone, laptop computer, or another device as understood by those of ordinary skill in the art. In some embodiments, the mobile device 17 communicates with the transmitter 5 and the receiver 7 using low power electromagnetic waves with a signal strength to enable the mobile device 17 to communicate with the self-checkout terminal 3 less than 10 meters from the self-checkout terminal to avoid interference with other electronic devices. In some configurations, the self-checkout terminal may be an automated-transaction-machine (ATM), a point-of-sale (POS) device, or another type of device useful to checkout customers 2 from an establishment where the customer 2 is purchasing multiple items.

In other configurations, the credential information includes customer account credentials associated with the monetary account that allows a remote banking server (computer) 15 to use the customer credentials to verify that the customer 2 has authorized access to the monetary account. The credentials may be stored in a digital wallet in the mobile device 17 and may be associated with a credit card, debit card, a store specific card, a gift card, or another card as understood by those of ordinary skill in the art. In yet other configurations, the self-checkout terminal 3 performs the payment transaction without requiring the use of any banking card and without reading any card because the self-checkout terminal 3 lacks a card-reader and, thus, incapable of reading information from any banking card. In this embodiment, the self-checkout terminal 3 may access the credentials of an account such as a savings or a checking account or the like stored in the mobile device 71, stored in an account network 13, stored on the account computer 15, stored in a local store network 14 such as an IPNet, or stored in another location to withdraw the required funds to pay for the items to be purchased.

In one configuration, computing resources on the IPNet may use the calculated total of every item to be purchased when the customer 2 is detected to be approaching the self-checkout terminal 3, as discussed below. When the customer 2 is near a self-checkout terminal 3, the IPNet may send the necessary total cost information, and in some cases factoring coupons or other value shopper discounts into the total, to the self-checkout terminal 3 to allow the customer 2 to self-checkout at the terminal 3 with minimal interruption.

The message logic 11 transforms the shopping data into checkout data that includes data representing the collection of purchase items. For example, the message logic 11 may combine the shopping data to include each item of purchase that was selected by the customer 2 that are either in the cart or being carried by the customer 2, along with a price of each item and how many of a particular item were selected. The shopping data may also be packed into one or more packets of data for transfer from the mobile device 17 before transmission to the self-checkout terminal 3, the account computer 15, the account network 13, or another network or device.

In some embodiments, the transmitter will transmit the credential information to an account network 13 for authentication, for example, an account computer 15 (banking/finance computer or server) on the account network 13 will receive the credentials and attempt to verify/match them to an account stored on the account computer 15. For example, biometric data in the credentials may be matched against known biometric data in the account computer 15, wherein the biometric data in the computer 15 is pre-stored biometric data of the account holder or an authorized user of the account. In some instances, the account network 13 and the account computer 15 may both be referred to as a network of servers that may include other computers, routers, switches, gateways, and the like as understood by those of ordinary skill in the art.

In some configurations, the receiver 7 will receive a response from the account network 13 indicating if the monetary account is authorized to pay for the collection of purchase items. Alternatively, if the account computer is unable to authorize the preferred monetary account, then it will return this indication possibly in the form of an electronic message to the self-checkout terminal 3 and/or the mobile device 17 so that the customer 2 may be notified and prompted to select another account, and/or deposit additional funds to an account that is authorized (authenticated) to pay for the purchase items the customer 2 has collected before the customer 2 leaves the retail establishment.

In the preferred embodiment, if the initial/preferred monetary account was authorized but was found to have insufficient funds, then the customer 2 may be prompted by displaying message(s) on the mobile device 17 by a device on the account network 13 or the local store network 14 to select another source of funds, let the purchase default to an automatic secondary/backup source of funds, or add additional funds to the authenticated account with insufficient funds. When there are insufficient funds in the authorized account, the system 1 may prompt the customer 2 to determine if they desire to add funds now or later when finished shopping. With either response, the account network 13 will generate and transmit to the mobile device 17 a message asking whether the customer 2 desires to add funds to the currently selected account.

Figure 2:
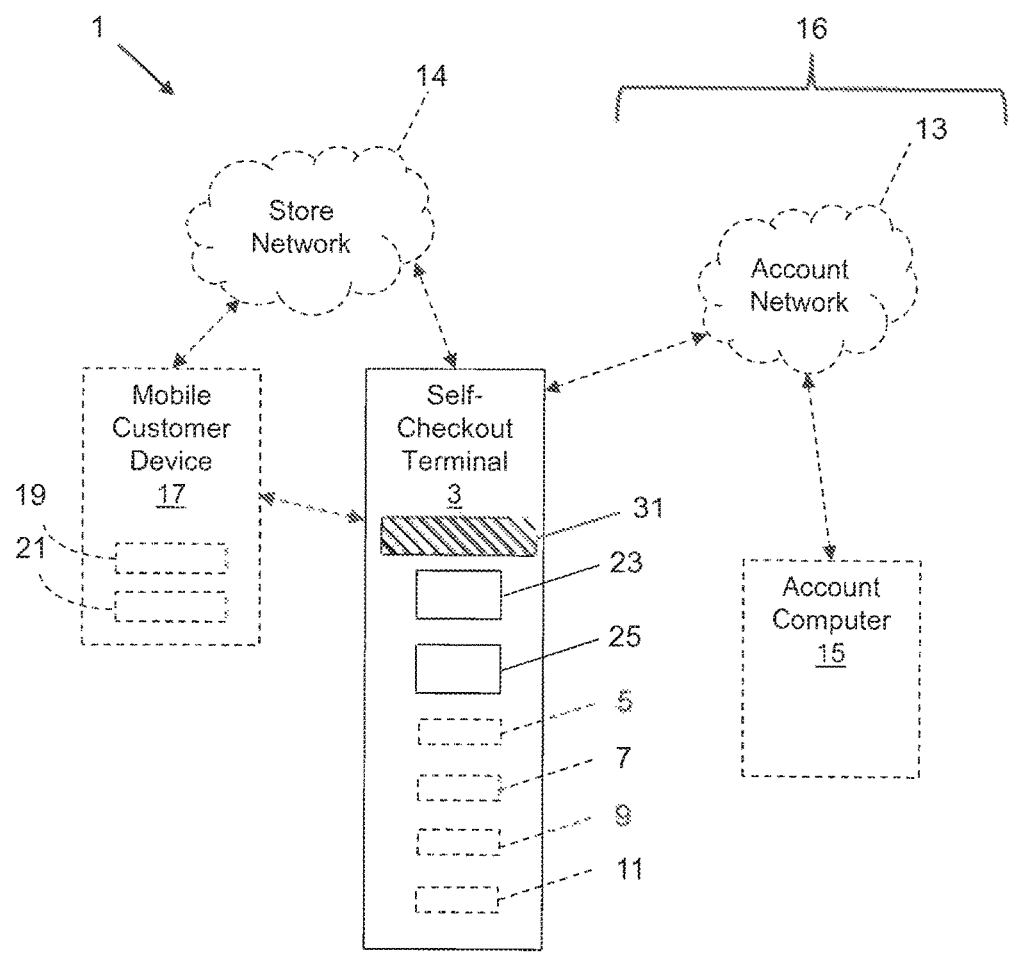
FIG. 2 illustrates another an example system using a self-checkout terminal for paying for items selected in a store.

In one exemplary example, the self-checkout terminal has a monetary-acceptance device 25 (FIG. 2) to accept cash or other deposits. In this embodiment, when the account network 13 is notified that the monetary account has insufficient funds to pay for the collection of purchase items, the account computer 15 generates a message to the customer 2 indicating insufficient funds and transmits this message so that it eventually arrives at the mobile device 17. Additionally, an insufficient funds symbol is also sent in the same message, or different message, to the mobile device 17 carried by the customer 2. The insufficient funds symbol may be a Quick Response (QR) code, a code transmitted as a near-field-communication (NFC) signal, or another type of code as understood by those of ordinary skill in the art.

Later, upon the mobile device 17 and customer 2 reaching the self-checkout terminal 3, the self-checkout terminal 3 will receive the insufficient funds symbol from the mobile device 17. Upon the insufficient funds symbol being verified so that there is a very high degree that the person at the self-checkout terminal is the account holder, the monetary-acceptance device 25 is placed in a condition to receive the additional funds from the customer 2. Now, the monetary-acceptance device 25 is ready to receive additional funds to pay for the items purchased. The customer 2 may now either return to shopping and/or leave the store after paying for their entire group of gathered items for purchased.

Figure 4:
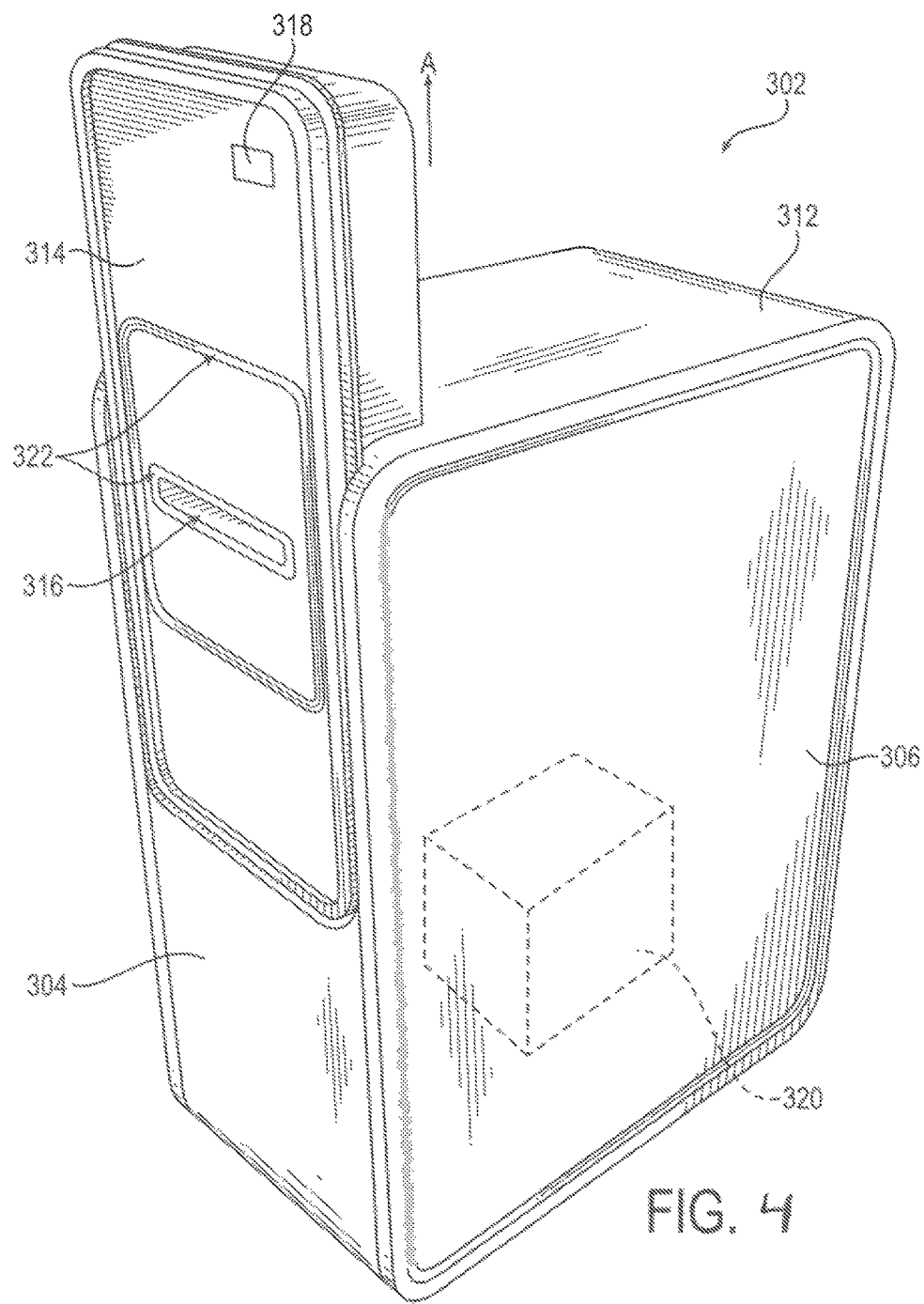
FIG. 4 is a right-front perspective view of an automated-transaction-machine embodiment.
Figure 5:
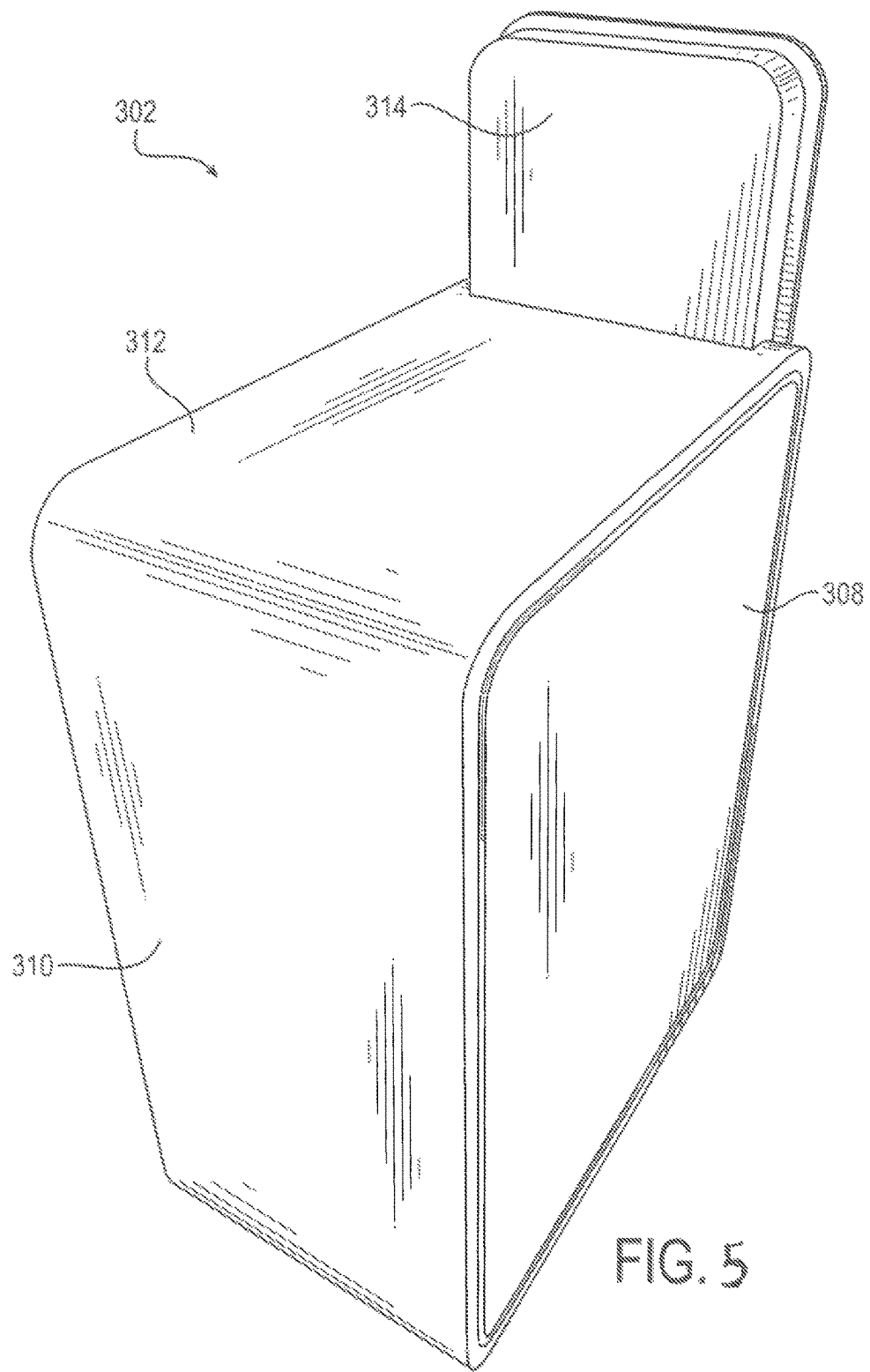
FIG. 5 is left-back perspective view of an automated-transaction-machine embodiment.
Figure 6:
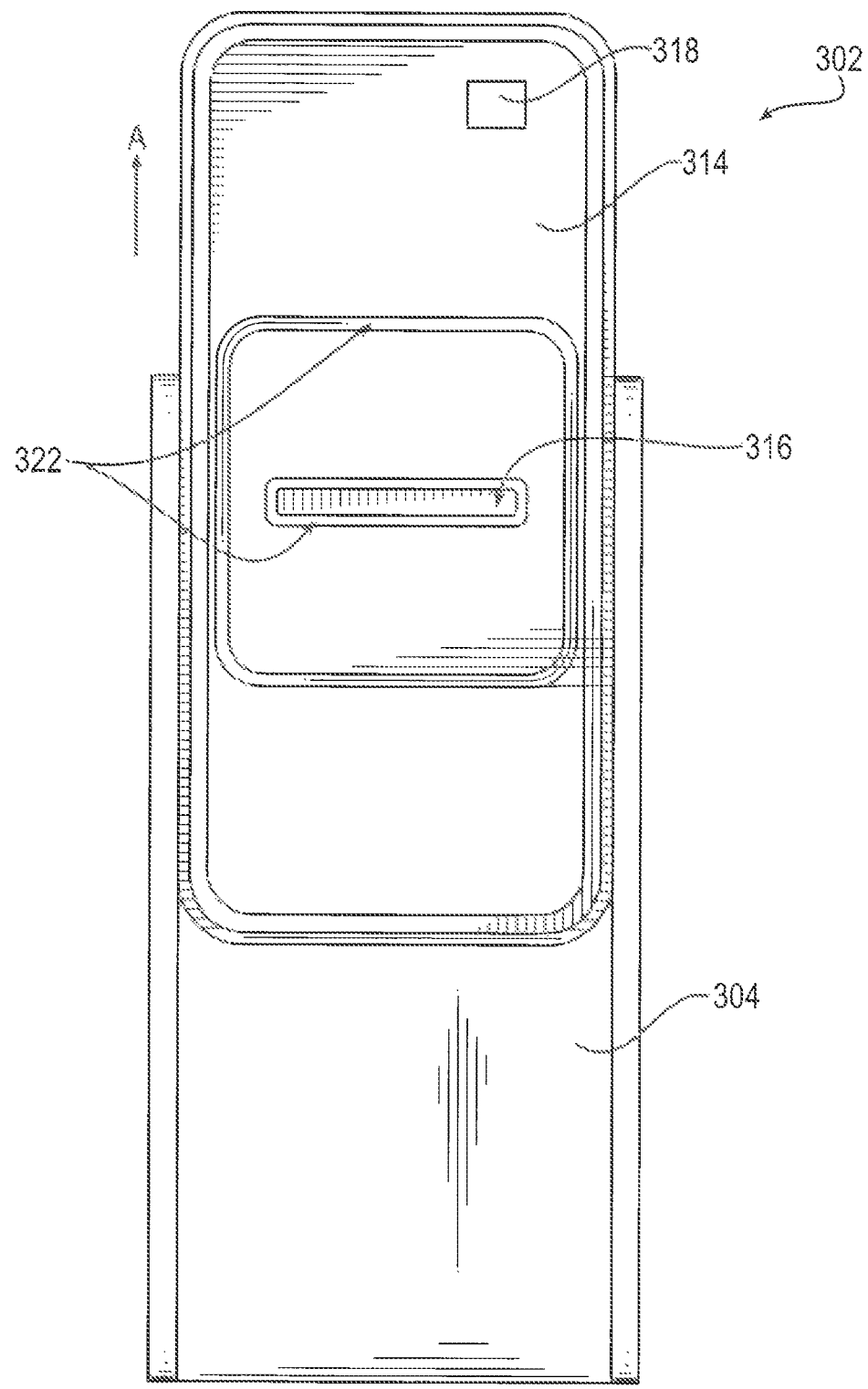
FIG. 6 is a front view of an automated-transaction-machine embodiment.
Figure 7:
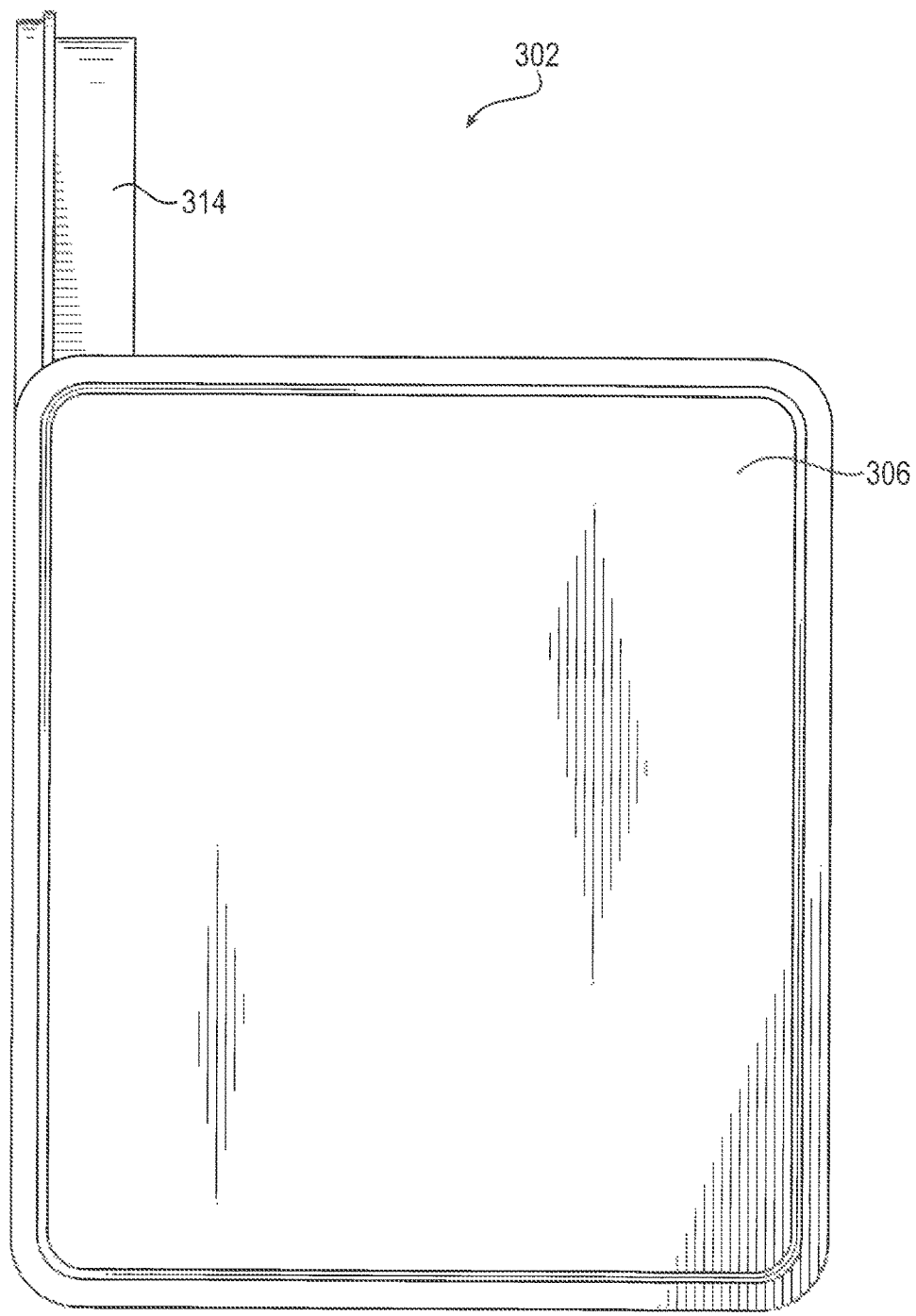
FIG. 7 is a view of the right side of an automated-transaction-machine embodiment.
Figure 8:
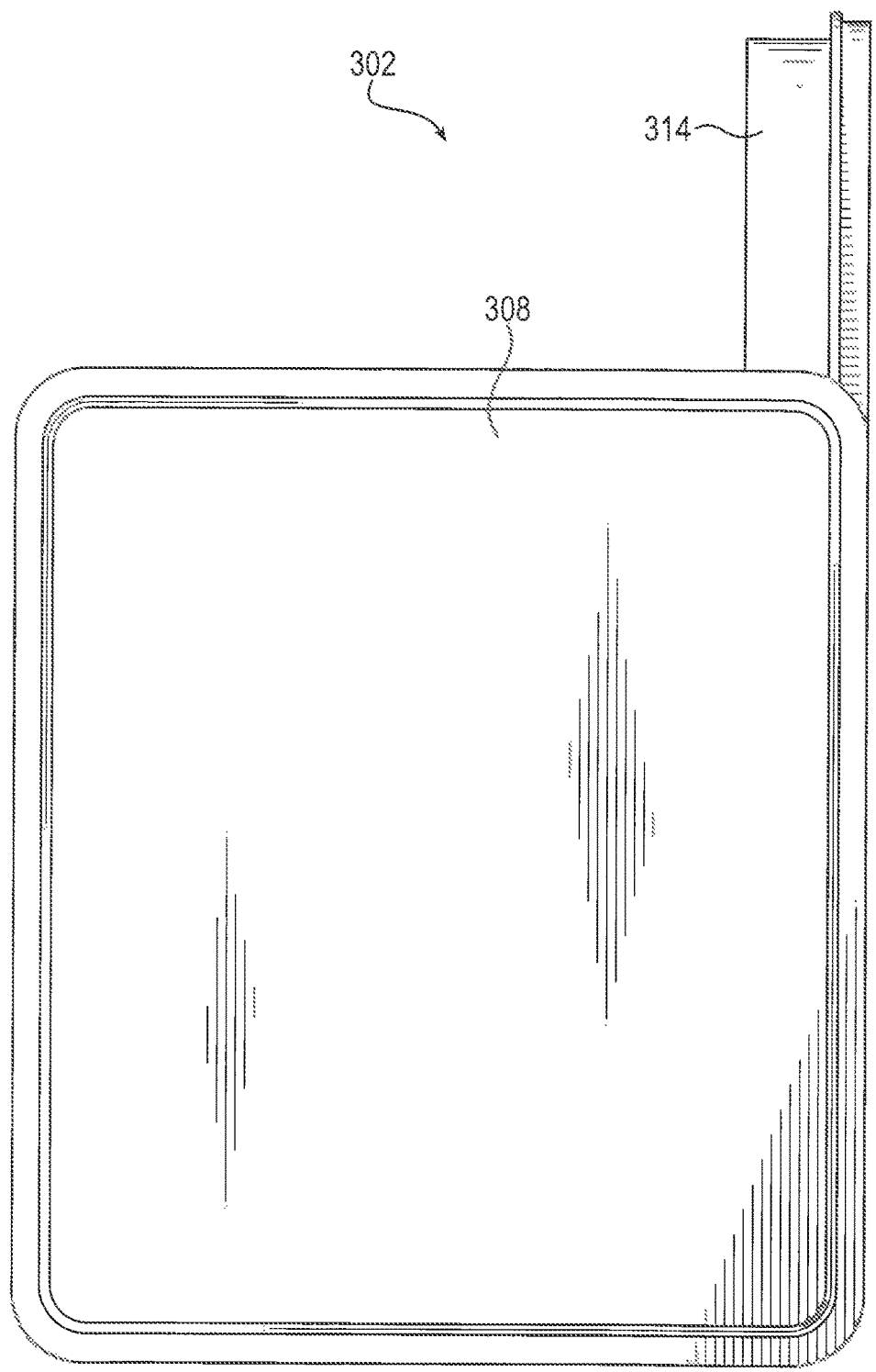
FIG. 8 is a view of the left side of an automated-transaction-machine embodiment.
Figure 9:
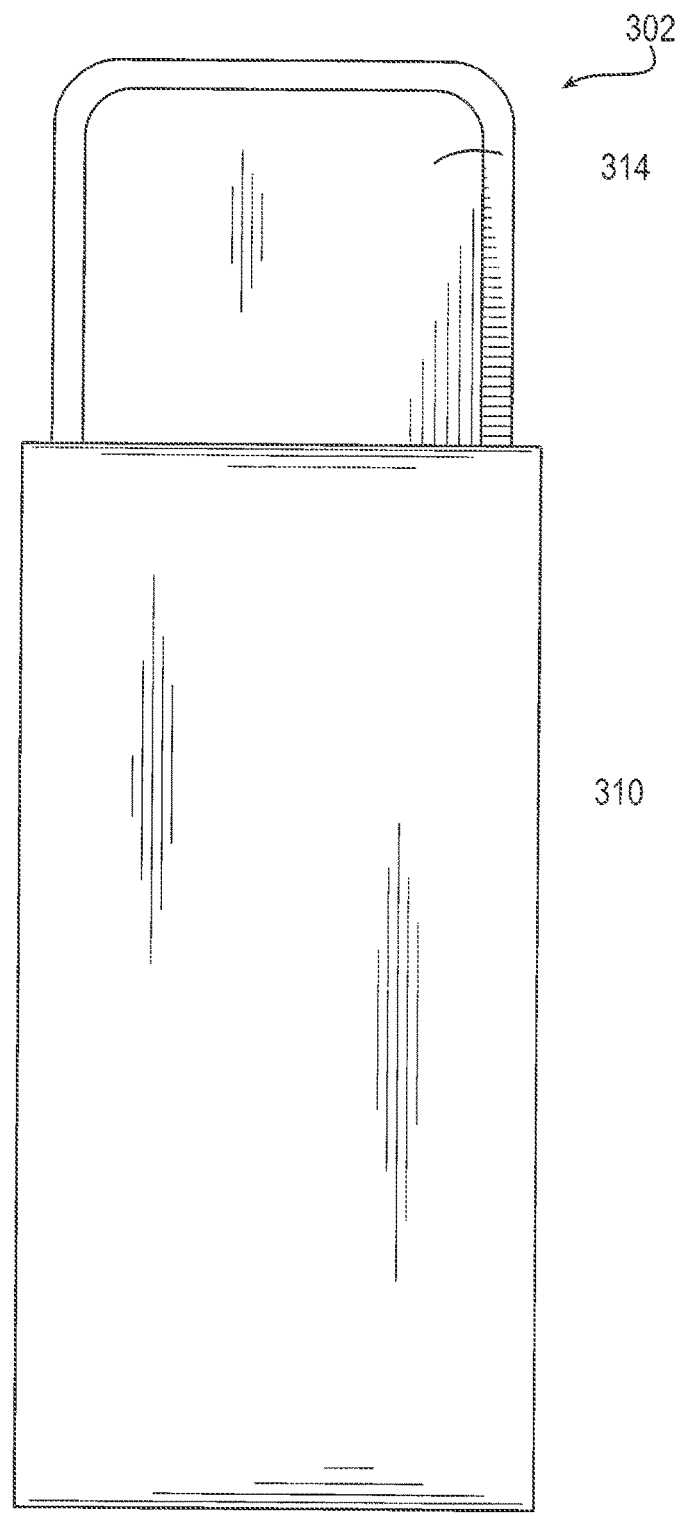
FIG. 9 is a back view of the design of an automated-transaction-machine embodiment.
Figure 10:
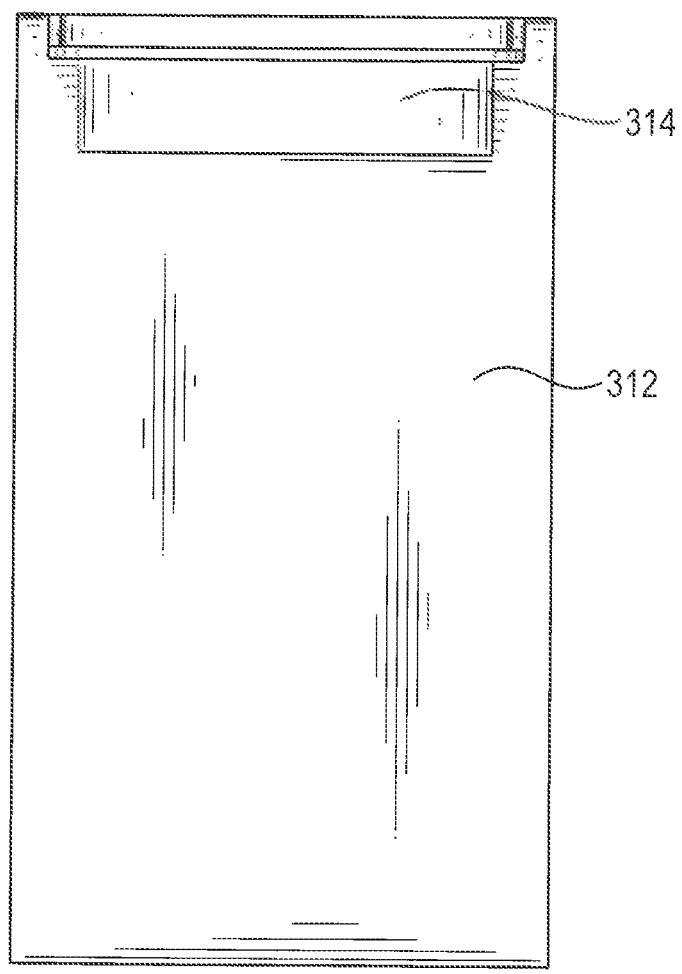
FIG. 10 is a top view of an automated-transaction-machine embodiment.

In another embodiment, the payment logic 9 causes the self-checkout terminal 3 to indicate to the customer 2 that a payment using the monetary account for the purchase items is authorized or that the payment was not authorized. When authorized, an authorization for payment is received at the self-checkout terminal 3 before the customer 2 arrives at the self-checkout terminal 3. When authorized, the self-checkout terminal 3 additionally causes a payment transaction to be executed to provide for self-checkout and the payment using the monetary account without scanning the items at the self-checkout terminal and without assistance by another person. In some configurations, when the monetary account is authorized and the payment transaction is successfully executed and pays for the purchase items, the self-checkout terminal 3 generates a signal to indicate to the customer 2 that the payment for the purchase items has been successfully completed and may also illuminate a signal indicating payment has been made (also see FIG. 4 light emitting diodes LEDs 322). For example, the signal may be an illuminated green area 31 associated with the self-checkout terminal 3.

The account network receives a request for cash from the customer 2, wherein the account network is authorized to approve the request based, at least in part, on credentials received from the customer 2 and a value of the monetary account and, when approved, to issue and transmit a cash-back symbol to a mobile device carried by the customer 2, wherein upon reaching the self-checkout terminal, the self-checkout terminal is adapted to receive the cash-back symbol from the mobile device, and upon the cash-back symbol being verified, the cash-dispensing device dispenses an amount of the request for cash. Similar to the insufficient funds symbol discussed above, the cash-back symbol may be a Quick Response (QR) code, a code transmitted as a near-field-communication (NFC) signal, or another type of code as understood by those of ordinary skill in the art.

Figure 3:
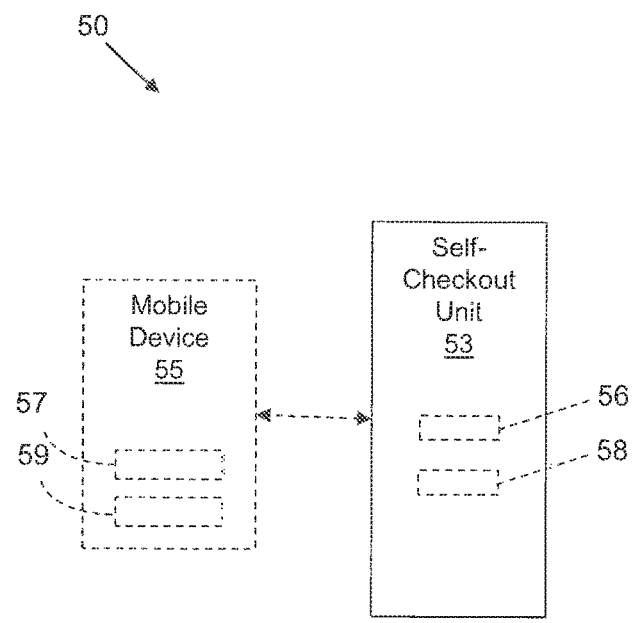
FIG. 3 illustrates an example system of a different embodiment using a self-checkout unit for paying for items selected in a store.

FIG. 3 illustrates an example embodiment of a payment system 50. The payment system 50 includes a self-checkout unit 53. The self-checkout unit is in communication with the mobile device 55. The mobile device 55 receives data that is representative of at least one item to be purchased by a user of the mobile device 55. For example, the data may include a code and/or description of the item, a price of the item, possibly a number of the item selected by the user, and other information about each item selected by the user while shopping for items in a retail establishment. The self-checkout unit 53 at least partially processes a transaction for purchase of the item(s), based, at least in part, on the data from the mobile device 55 related to the item(s). A payment for the item(s) is processed at the self-checkout unit 53 solely by the user without any other persons required at the self-checkout unit and other than an optional single tap of the self-checkout unit no other touching of the self-checkout unit 53 is required.

In other embodiments, the payment system 50 may have other similar features of the system 1 discussed above (FIG. 1-2). For example, the payment system 50 may be able to provide cashback and accept deposits. In at least one embodiment, the self-checkout unit 53 further has a currency dispensing device 56 for dispensing currency as cash-back to the user as part of the transaction for purchase of the item(s). The self-checkout unit 53 may also accept at least part of the payment made via preloaded card information found in a mobile wallet 57 that is accessed with a mobile application 59 in the mobile device 55. And the self-checkout unit may accept at least part of the payment made via cash (or other monetary notes) inserted into a deposit unit 58 of the self-checkout unit 53. Additionally, the self-checkout unit 53 may also accept payments made using preloaded banking information found in the mobile device 55.

FIGS. 4-11 illustrate another example embodiment of an automated-transaction-machine (ATM) 302 which may be utilized as the ATM 302 referenced in the description below. In a retail environment, a consumer may utilize the ATM 302 as a self-checkout concept as disclosed above with reference to FIGS. 1-3. Such a concept may be a mobile-enabled self-checkout concept.

Items for purchase may be scanned with a mobile device by a user. Such a device may include a mobile application (app) for self-checkout shopping. Data correlated to the scanned items may be uploaded, for example, to a local computer or server, to a network computer or server (intranet or internet), uploaded to the "cloud", or uploaded directly to an ATM.

In at least one embodiment, a concept combines the core capabilities of a traditional ATM, such as funds withdrawal or deposit, with the convenience of contactless mobile payments and self-checkout in the same terminal. In at least one embodiment, an ATM for self-checkout shopping is also enabled for cash-in and cash-out transfers. In some embodiments, a mobile device works in cooperation for in-store mobile payments. In some configurations a terminal for self-checkout shopping includes acceptance of digital wallets and mobile payments.

In at least one embodiment, a mobile device with an app enables consumers to scan items they want to purchase while shopping in-store via their mobile device. Once a consumer is ready to pay, they initiate their device to interact, e.g. tap, with a self-checkout unit to pay for the items when exiting, or another appropriate time. Payment may be made via preloaded card information found in the consumers' mobile wallet within the retailer's mobile app or cash inserted into the terminal, or any other appropriate funds. Cash-back may also be offered through the checkout terminal, which can function as a traditional ATM. This process may eliminate traditional checkout lines and may increase consumer loyalty through the use of stored-value cards, mobile marketing campaigns, membership rewards programs, and the like.

In at least one embodiment, fast, secure ATM technology is used in cooperation with a mobile device to enable mobile self-checkout. The convergence of ATMs, self-checkout terminals, and mobile devices may deliver speed and convenience to consumers and also standardize cash handling into a single automated experience for a retail location.

FIGS. 4-9 illustrate an example ATM 302 (e.g., banking terminal) that has a cash dispenser but does not have a card reader, keypad, nor an alphanumeric screen. The ATM 302 has a front side 304, a right side 306, a left side 308, a back side 310, a top side 312, and a bottom side (not illustrated). The ATM 302 includes a front panel 314 that may slide upward in the direction of arrow A when the ATM 302 is to be placed in operation. The front panel 314 may include an elongated orifice/opening 316 through which paper currency (cash) may be dispensed to a banking customer, for example. Some embodiments may also include a biometric sensor 318, an internal vault for storing paper currency 320, and/or light emitting diodes LEDs 322 recessed into the front panel 314 around the opening 316.

Figure 11:
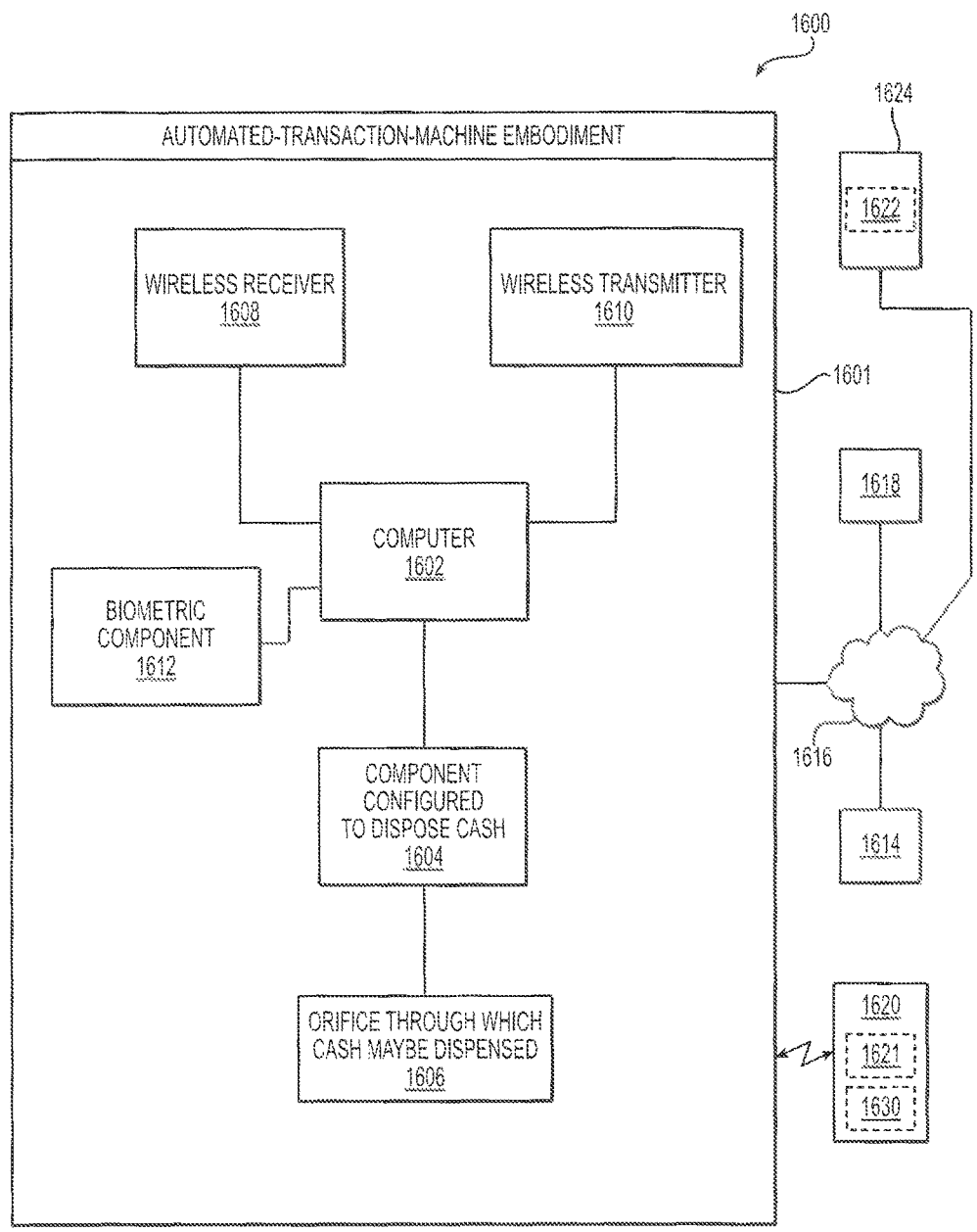
FIG. 11 is a schematic showing components included in an automated-transaction-machine embodiment.

FIG. 11 illustrates more detail of the example ATM of FIGS. 3-9. Various embodiments include an ATM 1600 (FIG. 11) that includes: a housing 1601, a computer 1602 (e.g., processor), a component 1604 dispenses cash with an orifice 1606 through which cash may be dispensed, a wireless transmitter 1610, a wireless receiver 1608. The ATM 1600 may not include a screen that may display alphanumeric characters, a card reader to read card data that can be used to identify a financial account. The machine may also not include a printer, may not include a component for dispensing paper receipts, and/or may not include user-interface buttons or may have a limited number of user-interface buttons.

In at least one embodiment, the ATM 1600 may be a cash-dispensing banking terminal. The banking terminal 1600 may have a housing 1601, a transmitter 1610, a receiver 1608, a cash dispenser 1604, and a processor 1602 t at least partially control the cash dispenser 1604. A pre-created banking transaction request was earlier created using a mobile device 1620 before a banking consumer and the mobile device 1620 arrive at the cash-dispensing banking terminal 1600. A remote computing device 1614 authenticates and authorizes the pre-created banking transaction request before the banking consumer and the mobile device 1620 arrive at the cash-dispensing banking terminal 1600. When the pre-created banking transaction request is authenticated and authorized, a remote computer generates an executable transaction request 1622 and also generates and sends a transaction identifier 1621 associated with an executable transaction request 1622 to the mobile device 1620. The executable transaction request 1622 may be stored in a remote memory 1624 connected to the network 1616 so that it may later be retrieved and executed/performed. The receiver 1608 will receive the transaction identifier 1621 from the network 1616. When the banking consumer is at the banking terminal 1600, the remote computing device 1614 or another device will verify if the transaction identifier 1621 is valid. When valid, the banking terminal 1600 will perform the executable transaction request 1622 while the banking consumer is at the banking terminal 1600.

In some embodiments, the pre-created banking transaction request includes a request to dispense an amount of currency from the banking terminal 1600. The amount of currency may pre-deducted from a banking account of the banking consumer before the banking consumer is at the banking terminal 1600. The transaction identifier 1621 may be valid for a limited time and after the limited time, the transaction identifier 1621 is void and the executable transaction request 1622 will not be performed. For example, the limited time is two hours or less.

In one or more embodiments, the banking terminal 1600 is an automated-transaction-machine (ATM) lacking a keypad, lacking a card reader, and lacking user interface buttons. The banking terminal 1600 may also be an ATM and lacks a keypad and lacks a card reader. The receiver 1608 may receive the transaction identifier 1621 using wireless near-field-communication (NFC) traveling a distance of three feet or less, and the transmitter 1610 may be an NFC wireless transmitter.

In some embodiments, one method of operation of the banking terminal 1600 may include time limited secure transactions. For example, a secure financial transaction may be completed in 10 seconds or less. Such a transaction may include cash dispensing.

The banking terminal 1600 may have a reduced footprint (width and/or depth) as compared to the height of the banking terminal 1600. For example, the banking terminal 1600 may have a depth up to 32% less than a standard banking terminal 1600 and a width up to 37% less than a standard banking terminal 1600.

In some embodiments, banking terminal 1600 may contain other useful features or components. For example, software 1630 in the mobile device 1620 communicates with the remote computing device 1614 to authenticate and authorize the pre-created banking transaction request before the banking consumer and the mobile device 1620 arrive at the cash-dispensing banking terminal 1600. The transaction identifier 1621 may be formed with a bar code, a biometric input collected at a biometric component 1612, a quick response (QR) code, and/or a symbol. In some embodiments, the mobile device 1620 is a mobile phone. The receiver 1608 may receive the transaction identifier 1621 from the mobile device 1620 when the mobile device 1620 is tapped against the banking terminal 1600. The banking terminal 1600 may contain a vault that may be loaded with the cash and have the capability to dispense cash responsive to the executable transaction request 1622. In other configurations, the mobile device 1620 has no communications with the banking terminal 1600 until after the transaction identifier 1621 and executable transaction request 1622 are created.

In some embodiments, banking terminal 1600 may have a light emitting diode (LED) lighting 322 (FIG. 3) that illuminates a first color when no transaction identifier 1621 has been received, or when the transaction identifier 1621 is invalid. When no banking transaction is being processed the LED lighting may be illuminated with a second color that is different than the first color. Also, the LED lighting may also be illuminated to another color when the transaction identifier 1621 has been received, when the transaction identifier 1621 is valid, and/or when the banking transaction is being processed.

Figure 12:
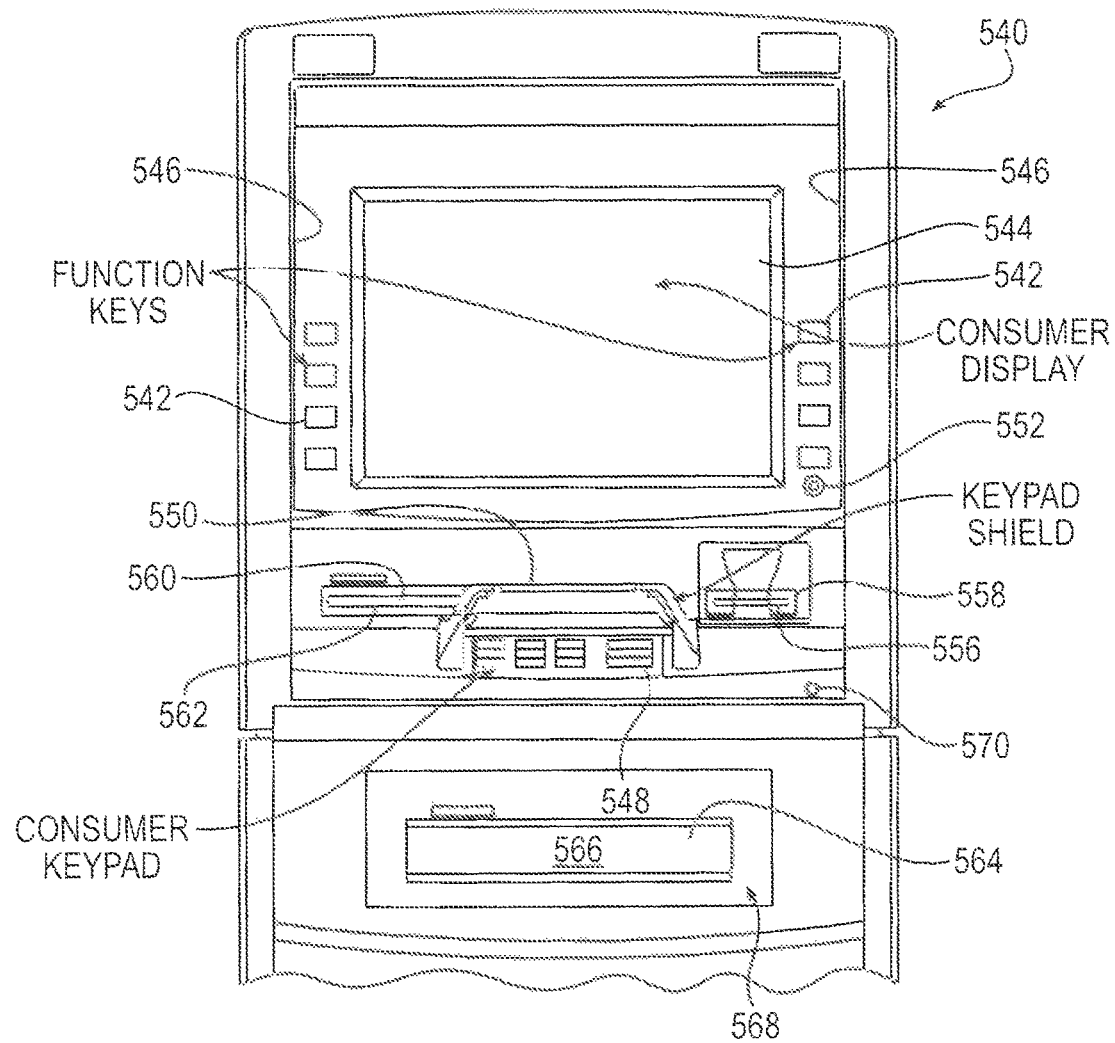
FIG. 12 is perspective view of a traditional automated-transaction-machine.

FIG. 12 illustrates an exemplary known automated-transaction-machine 540 and is provided herein so that a relative comparison may be performed with the embodiments of the Automated-Transaction-Machine (ATM) lacking a keypad, lacking a card reader, lacking an alphanumeric screen, and lacking other components as discussed above. Specifically, the exemplary ATM 540 in FIG. 12 includes a keypad 548 that has user interface buttons. The keypad 548 has an overlying relation thereof a keypad shield or cover 550. Each of the keys of the keypad as well as the area within the keypad cover may be commonly contacted by user fingers in operation of the exemplary ATM 540.

Also included in the known ATM 540 is a headphone jack 552. Headphone jack 552 is adapted to receive plug in connectors from headphones used by visually impaired persons in the operation of the machine. An area adjacent to the headphone jack 552 will commonly be contacted by fingers of machine users, particularly visually impaired user.

The exemplary ATM 540 shown in FIG. 17 also includes a receipt printer that is in operative connection with a paper outlet 560. The paper outlet area generally indicated 562, extends generally adjacent to the paper outlet in an area where users will commonly contact the machine fascia when taking receipts that are printed by the machine during transactions. A cash dispenser outlet 564 is operative to deliver cash from the ATM to users. In this known ATM, the cash dispenser outlet is generally blocked by one or more gate members 566 except when the ATM is operating to deliver cash to a user. During such times at least one processor of the machine is operative to cause an actuator to move the gate member so that currency bills can be extended therethrough. A cash outlet area generally indicated 568 includes an area that extends generally adjacent to the cash dispenser outlet (and may include the outlet as well as the gate member thereof) and which users generally contact the machine with their fingers when obtaining cash from the exemplary ATM 540. Also shown are a screen 544, a card reader 558, a card-reader orifice 556, function keys, a consumer display, and a consumer keypad.

Example methods may be better appreciated with reference to flow diagrams. For purposes of simplicity, explanation of the illustrated methodologies are shown and described as a series of blocks. It is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not-illustrated blocks. Thus, the depicted blocks, functions and/or other components may be implemented as parts of a monolithic software structure, as standalone software modules, or as modules that employ external routines, code, services, and so forth, or any combination of these. All such implementations are within the scope of the present disclosure.

Figure 13:
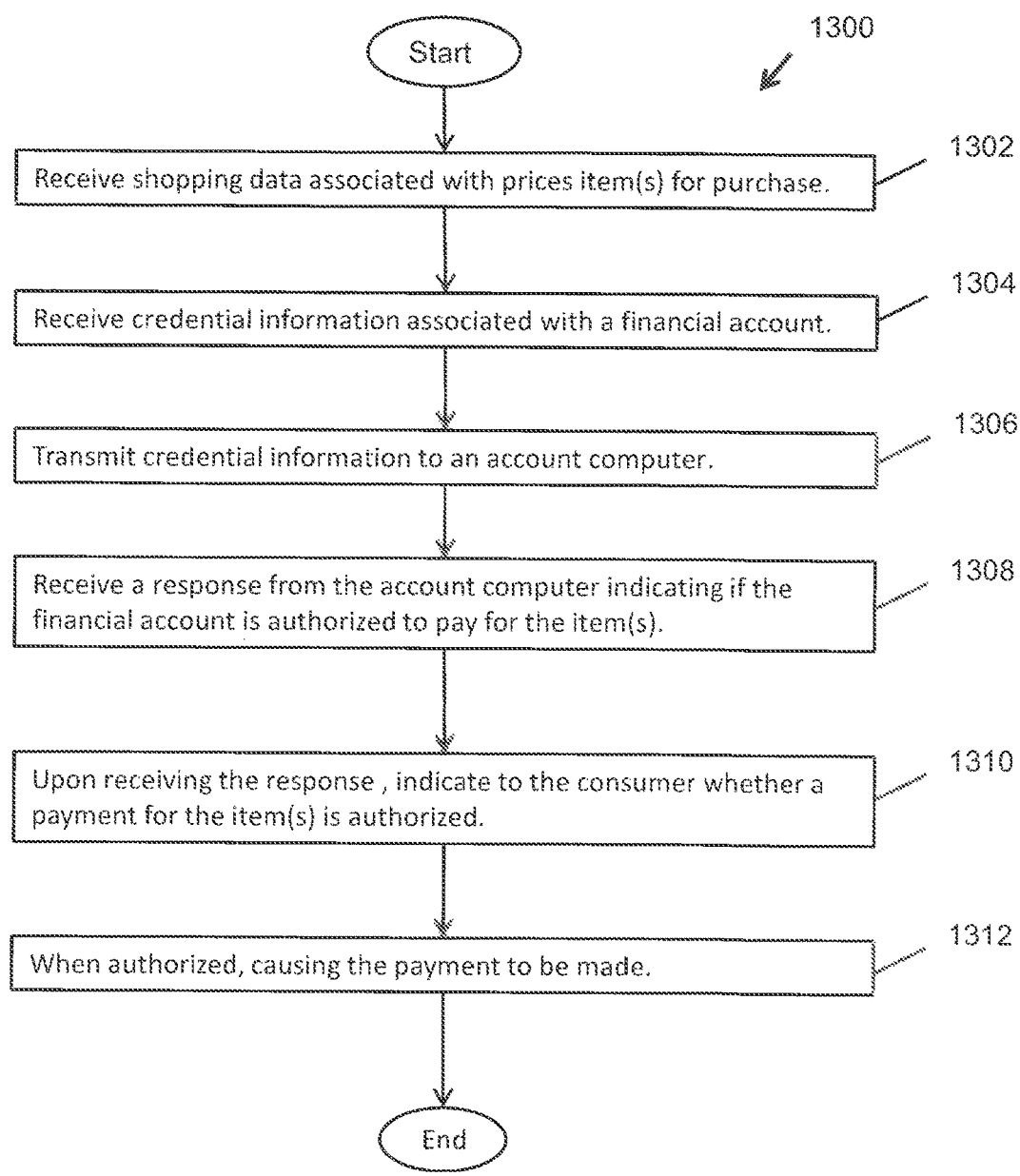
FIG. 13 is an example embodiment of a method of self-checking out of a store after selecting items for purchase.

FIG. 13 illustrates a method 1300 of self-checkout of shopping items. The method 1300 begins by receiving shopping data associated with prices of one or more items for purchase. In one embodiment, the item(s) are considered received when a consumer has physically acquired the item(s) during a shopping activity. Physically acquiring items may mean picking them up and carrying them, placing them in a cart or shopping bag, or acquiring them in another way with the intent to pay for the purchase items. Credential information associated with a financial account, is received, at 1304. The credential information is used to pay for the item(s) the customer desires to purchase.

In some configurations, after the credential information is received at a self-checkout terminal, it is then transmitted, at 1306, to an account computer of an account network for authentication. After potentially being authenticated, with a corresponding financial account, a response is received from the account computer, at 1308, indicating if the financial account corresponding to the credentials is authorized to pay for the one or more items. Upon receiving the response, an indication is provided to the consumer, at 1310, indicating whether a payment for the items is authorized. This indication is provided as the consumer approaches and before the consumer is at the self-checkout terminal. When authorized, the method 1300 causes the payment to be made on behalf of the customer to allow for a self-checkout and payment of the item(s) for purchase, using the financial account. The payment is made without scanning the items at a self-checkout terminal and without assistance by another person. The payment may be made with an optional single tap of the self-checkout terminal without any other required touching of the self-checkout terminal.

Figure 14:
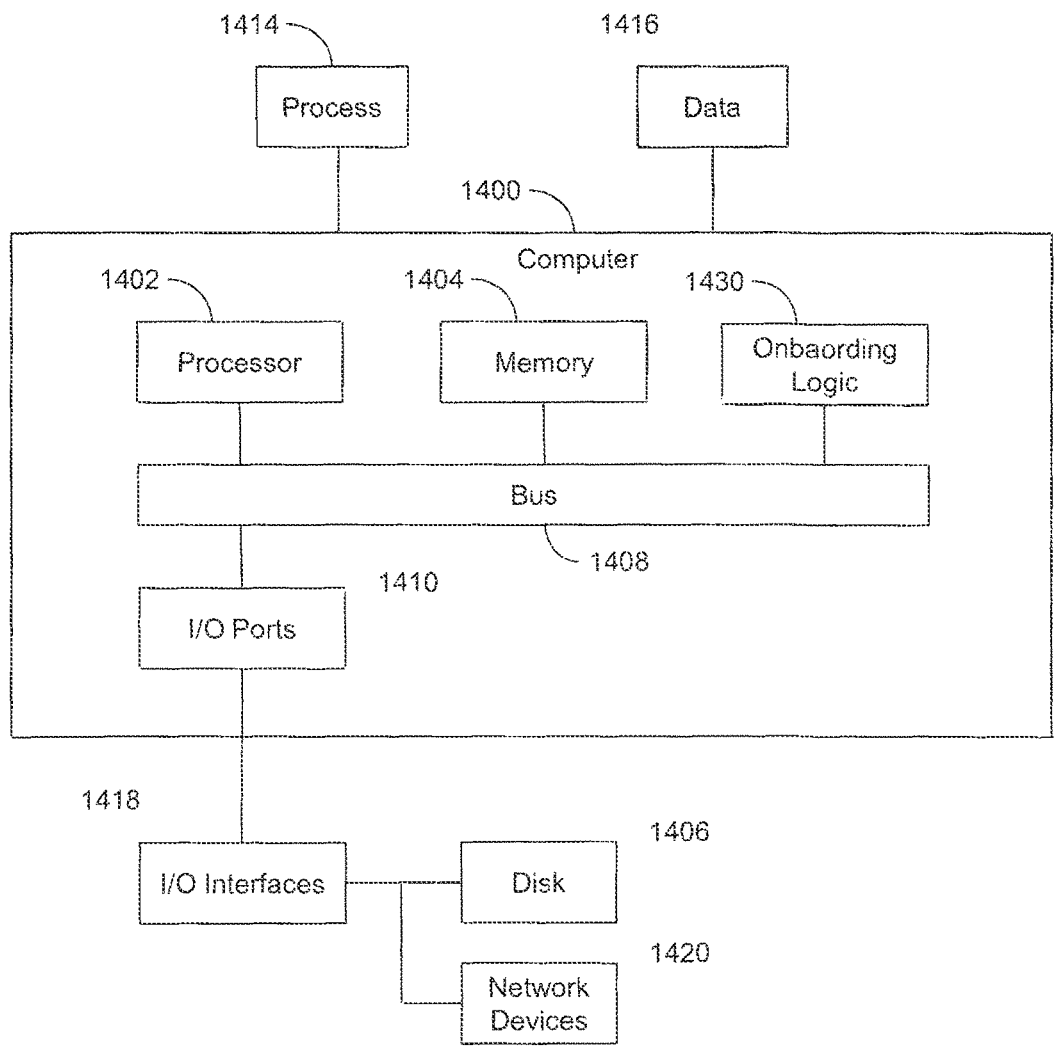
FIG. 14 is an example computing environment in which various embodiments or portions of embodiments may operate Similar numbers refer to similar parts throughout the drawings.

FIG. 14 illustrates an example computing device in which example systems and methods described herein, and equivalents, may operate. The example computing device may be a computer 1400 that includes a processor 1402, a memory 1404, and input/output ports 1410 operably connected by a bus 1408. In one example, the computer 1400 may include self-checkout logic 1430 performing some of the actions of the payment logic, the message logic, and other actions as discussed above. In different examples, the self-checkout logic 1430 may be implemented in hardware, software, firmware, and/or combinations thereof. Thus, the self-checkout logic 1430 may provide means (e.g., hardware, software, firmware) for a customer to self-checkout without being assisted by another person in a bounded designated payment area including any terminal used in the self-checkout process. While the self-checkout logic 1430 is illustrated as a hardware component attached to bus 1408, it is to be appreciated that in one example, the self-checkout logic 1430 could be implemented in the processor 1402.

Generally describing an example configuration of the computer 1400, the processor 1402 may be a variety of various processors including dual microprocessor and other multi-processor architectures. The memory 1404 may include volatile memory and/or non-volatile memory. The non-volatile memory may include, for example, ROM, programmable read only memory (PROM), EPROM. The volatile memory may include, for example, RAM, synchronous random access memory (SRAM), dynamic random access memory (DRAM), synchronous dynamic random access memory (SDRAM), double data rate synchronous dynamic random access memory (DDR SDRAM), direct Rambus random access memory (DRRAM) and the like.

A disk 1406 may be operably connected to the computer 1400 via, for example, an input/output interface (e.g., card, device) 1418 and an input/output port 1410. The disk 1406 may be, for example, a magnetic disk drive, a solid state disk drive, a floppy disk drive, a tape drive, a Zip drive, a flash memory card, and/or a memory stick. Furthermore, the disk 1406 may be a compact disc-ROM (CD-ROM), a compact disk (CD) recordable drive (CD-R drive), a CD rewriteable drive (CD-RW drive), and/or a digital video ROM drive (DVD ROM). The memory 1404 can store a process 1414 and/or the data 1416, for example. The disk 1406 and/or the memory 1404 can store an operating system that controls and allocates resources of the computer 1400.

The bus 1408 may be a single internal bus interconnect architecture and/or other bus or mesh architectures. While a single bus is illustrated, it is to be appreciated that the computer 1400 may communicate with various devices, logics, and peripherals using other busses (e.g., PCIE, SATA, Infiniband, 1384, USB, Ethernet). The bus 1408 can be types including, for example, a memory bus, a memory controller, a peripheral bus, an external bus, a crossbar switch, and/or a local bus.

The computer 1400 may interact with input/output devices via the input/output interfaces 1418 and the input/output ports 1410. Input/output devices may be, for example, a keyboard, a microphone, a pointing and selection device, cameras, video cards, displays, the disk 1406, the network devices 1420, and so on. The input/output ports 1410 may include, for example, serial ports, parallel ports, universal-serial bus (USB) ports and the like.

The computer 1400 can operate in a network environment and thus may be connected to the network devices 1420 via the input/output interfaces 1418, and/or the input/output ports 1410. Through the network devices 1420, the computer 1400 may interact with a network. Through the network, the computer 1400 may be logically connected to remote computers. Networks with which the computer 1400 may interact include, but are not limited to, a local area network (LAN), a wide area network (WAN), and other networks. The networks may be wired and/or wireless networks.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read only memory (EPROM) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example" and so on, indicate that the embodiment(s) or example(s) so described may include a particular feature, structure, characteristic, property, element, or limitation, but that not every embodiment or example necessarily includes that particular feature, structure, characteristic, property, element, or limitation.

What is claimed is:

1. A self-checkout terminal comprising:
a transmitter;
a receiver configured to receive shopping data associated with prices of purchase items that a customer has physically acquired during a shopping activity at a retail establishment, and wherein the shopping data is based, at least in part, on numbers corresponding to items for purchase that the customer has acquired during the shopping activity;
payment logic configured to receive credential information associated with a monetary account that the customer is to use to pay for a collection of purchase items for purchase that the customer has acquired during the shopping activity;
message logic configured to transform the shopping data into checkout data that includes data representing the collection of purchase items; and
a cash-dispensing device configured to dispense cash;

wherein the transmitter is configured to transmit the credential information to an account network for authentication;

wherein the receiver is configured to receive a response from the account network indicating if the monetary account is authorized to pay for the collection of purchase items; and wherein the payment logic is configured to cause the self-checkout terminal to indicate to the customer whether a payment using the monetary account for the purchase items is authorized, wherein when authorized an authorization is received at the self-checkout terminal before the customer arrives at the self-checkout terminal, wherein when authorized the self-checkout terminal is configured to cause a payment transaction to be executed to provide for self-checkout and the payment using the monetary account without scanning the items at the self-checkout terminal and without assistance by another person; and wherein the account network is configured to receive a request for cash from the customer, wherein the account network is authorized to approve the request based, at least in part, on credentials received from the customer, and a value of the monetary account and, when approved, to issue and transmit a cash-back symbol to a mobile device carried by the customer, wherein upon reaching the self-checkout terminal, the self-checkout terminal is adapted to receive the cash-back symbol from the mobile device, and upon the cash-back symbol being verified, the cash-dispensing device is configured to dispense an amount of the request for cash.

2. The self-checkout terminal of claim 1 wherein the payment logic is further configured to cause the self-checkout terminal to indicate to the customer that the payment for the purchase items is authorized when the customer approaches the self-checkout terminal, and wherein the shopping data is automatically sent to the receiver when purchase items are moved to be located adjacent the customer.

3. The self-checkout terminal of claim 1 wherein the receiver configured to receive the shopping data from a mobile device carried by the customer.

4. The self-checkout terminal of claim 3 wherein the mobile device is a mobile phone that communicates with the transmitter and the receiver using low power electromagnetic waves with a signal strength providing for the mobile device to communicate with the self-checkout terminal less than 10 meters from the self-checkout terminal.

5. The self-checkout terminal of claim 1 wherein the self-checkout terminal is at least one of the group consisting of: an automated-transaction-machine (ATM) and a point of sale (POS) device.

6. The self-checkout terminal of claim 1 wherein the credential information is received from a mobile device carried by the customer, and wherein the credential information comprises customer-account credentials associated with the monetary account that allows a remote banking server to use the customer-credentials to verify that the customer has authorized access to the monetary account.

7. The self-checkout terminal of claim 6 wherein the credentials are stored in a digital wallet in the mobile device and are associated with a credit card.

8. The self-checkout terminal of claim 1 wherein the self-checkout terminal is configured to perform the payment transaction without requiring the use of any banking card, and wherein the self-checkout terminal is incapable of reading information from any banking card.

9. The self-checkout terminal of claim 1 wherein the monetary account is authorized and the payment transaction is successfully executed and pays for the purchase items the self-checkout terminal generates a signal to indicate to the customer that the payment for the purchase items has been successfully completed.

10. The self-checkout terminal of claim 9 wherein the signal is an illuminated green area associated with the self-checkout terminal.

11. The self-checkout terminal of claim 1 wherein the cash-back symbol is one or more of the group consisting of: a Quick Response (QR) code and a code transmitted as a near-field-communication (NFC) signal.

12. The self-checkout terminal of claim 1 further comprising:

a monetary-acceptance device configured to accept cash deposits;

wherein the account network is notified that the monetary account has insufficient funds to pay for the collection of purchase items, wherein the account network has an account computer that in response to the monetary account having insufficient funds, generates a message to the customer indicating insufficient funds and transmit the message an insufficient funds symbol to a mobile device carried by the customer, wherein upon reaching the self-checkout terminal, the self-checkout terminal is adapted to receive the insufficient funds symbol from the mobile device, and upon the insufficient funds symbol being verified, the monetary-acceptance device is configured to receive.

13. The self-checkout terminal of claim 12 wherein the insufficient funds symbol is one or more of the group consisting of: a Quick Response (QR) code and a code transmitted as a near-field-communication (NFC) signal.

14. The self-checkout terminal of claim 1 wherein the shopping data is comprised of one or more packets of data.

15. The self-checkout terminal of claim 1 wherein a mobile application software on the mobile device is configured to tabulate scanned items and to transfer a tabulation result to the self-checkout terminal.

16. The self-checkout terminal of claim 1 wherein an account computer of the account network authorizes the payment but does not update account with purchase information.

17. The self-checkout terminal of claim 1 wherein the credential information is received from a mobile device carried by the customer.

18. A method of self-checkout of shopping item comprising:

receiving shopping data associated with prices of at least one item for purchase when a consumer has physically acquires the at least one item during a shopping activity move the at least one item adjacent the consumer;

receiving credential information associated with a financial account to be used to pay for the at least one item for purchase;

transmitting credential information to an account computer of an account network for authentication;

receiving a response from the account computer indicating if the financial account is authorized to pay for the at least one item;

when the response is received, indicating to the consumer whether a payment for the item is authorized, and wherein the indicating is provided as the consumer approaches and before the consumer is at the self-checkout terminal; and when authorized, causing the payment to be made to provide for a self-checkout and payment of the at least one item for purchase using the financial account without scanning the item at a self-checkout terminal and without assistance by another person, and wherein the payment is made with a single tap of the self-checkout terminal without any other required touching of the self-checkout terminal.

19. A self-checkout terminal comprising:

a transmitter;

a receiver configured to receive shopping data associated with prices of purchase items that a customer has physically acquired during a shopping activity at a retail establishment, and wherein the shopping data is based, at least in part, on numbers corresponding to items for purchase that the customer has acquired during the shopping activity;

payment logic configured to receive credential information associated with a monetary account that the customer is to use to pay for a collection of purchase items for purchase that the customer has acquired during the shopping activity;

message logic configured to transform the shopping data into checkout data that includes data representing the collection of purchase items; wherein the transmitter is configured to transmit the credential information to an account network for authentication; and a monetary-acceptance device configured to accept cash deposits;

wherein the receiver is configured to receive a response from the account network indicating if the monetary account is authorized to pay for the collection of purchase items; and wherein the payment logic is configured to cause the self-checkout terminal to indicate to the customer whether a payment using the monetary account for the purchase items is authorized, wherein when authorized an authorization is received at the self-checkout terminal before the customer arrives at the self-checkout terminal, wherein when authorized the self-checkout terminal is configured to cause a payment transaction to be executed to provide for self-checkout and the payment using the monetary account without scanning the items at the self-checkout terminal and without assistance by another person; and wherein the account network is notified that the monetary account has insufficient funds to pay for the collection of purchase items, wherein the account network has an account computer that in response to the monetary account having insufficient funds, generates a message to the customer indicating insufficient funds and transmit the message an insufficient funds symbol to a mobile device carried by the customer, wherein upon reaching the self-checkout terminal, the self-checkout terminal is adapted to receive the insufficient funds symbol from the mobile device, and upon the insufficient funds symbol being verified, the monetary-acceptance device is configured to receive.

20. The self-checkout terminal of claim 19, wherein the receiver configured to receive the shopping data from a mobile device carried by the customer.

21. The self-checkout terminal of claim 19, wherein the credential information is received from a mobile device carried by the customer, and wherein the credential information comprises customer-account credentials associated with the monetary account that allows a remote banking server to use the customer-credentials to verify that the customer has authorized access to the monetary account; and wherein the credentials are stored in a digital wallet in the mobile device and are associated with a credit card.

22. The self-checkout terminal of claim 19, wherein the self-checkout terminal is configured to perform the payment transaction without requiring the use of any banking card, and wherein the self-checkout terminal is incapable of reading information from any banking card.

23. The self-checkout terminal of claim 19, wherein the insufficient funds symbol is one or more of the group consisting of: a Quick Response (QR) code and a code transmitted as a near-field-communication (NFC) signal.

* * * * *

UNITED STATES PATENT AND TRADEMARK OFFICE
CERTIFICATE OF CORRECTION

PATENT NO. : 10,565,576 B2
APPLICATION NO. : 15/406184
DATED : February 18, 2020
INVENTOR(S) : Devon Watson et al.

Page 1 of 1

It is certified that error appears in the above-identified patent and that said Letters Patent is hereby corrected as shown below:

In the Specification

Column 11, Line 23, "The exemplary ATM 540 shown in FIG. 17" should read --The exemplary ATM 540 shown in FIG. 12--.

Signed and Sealed this
Eighteenth Day of August, 2020

Andrei Iancu
*Director of the United States Patent and Trademark Office*